Figure 1:
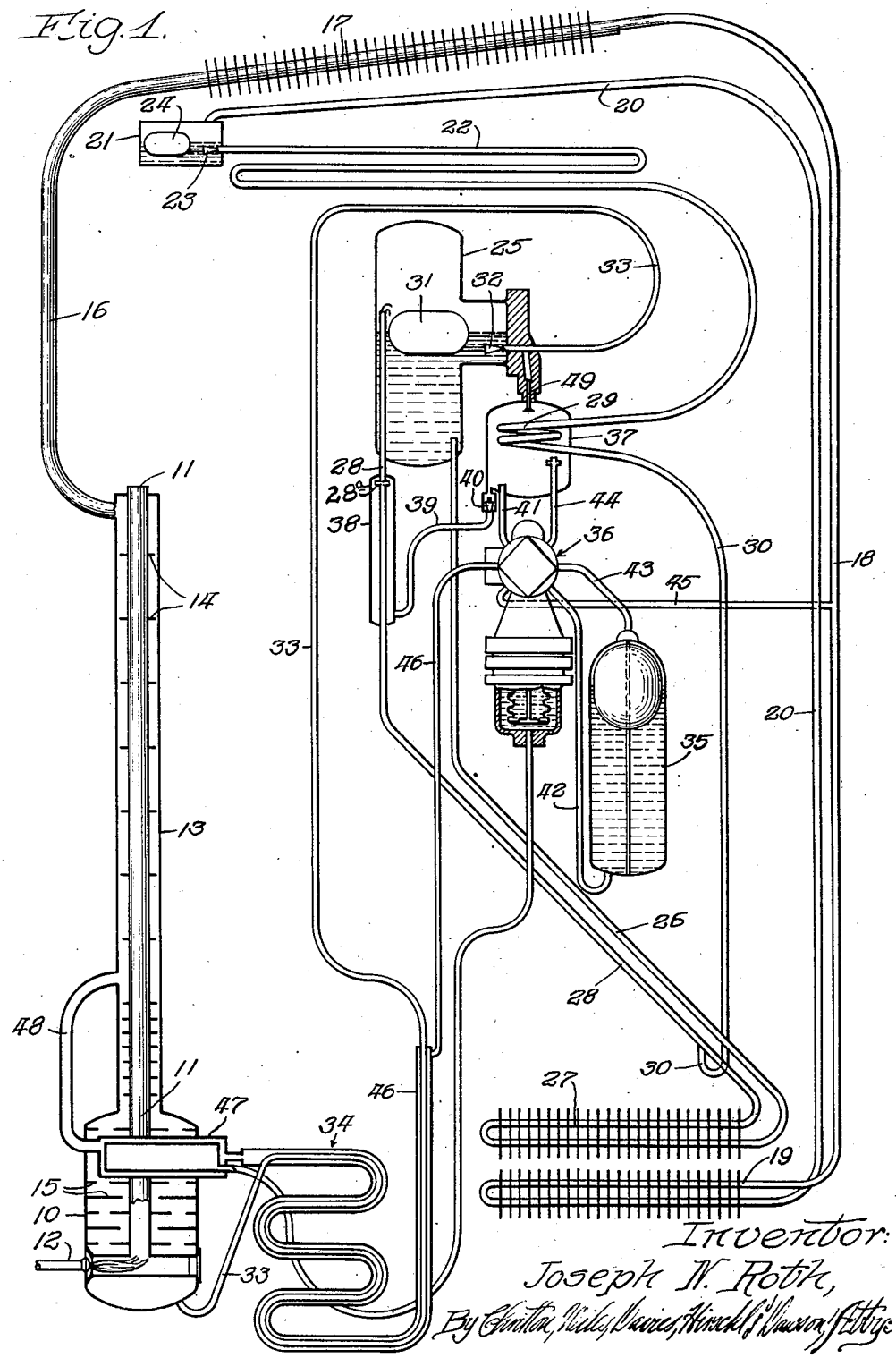

Jan. 25, 1944.  J. N. ROTH  2,339,811
ABSORPTION REFRIGERATOR
Filed Sept. 28, 1939  2 Sheets-Sheet 1

Inventor:
Joseph N. Roth,

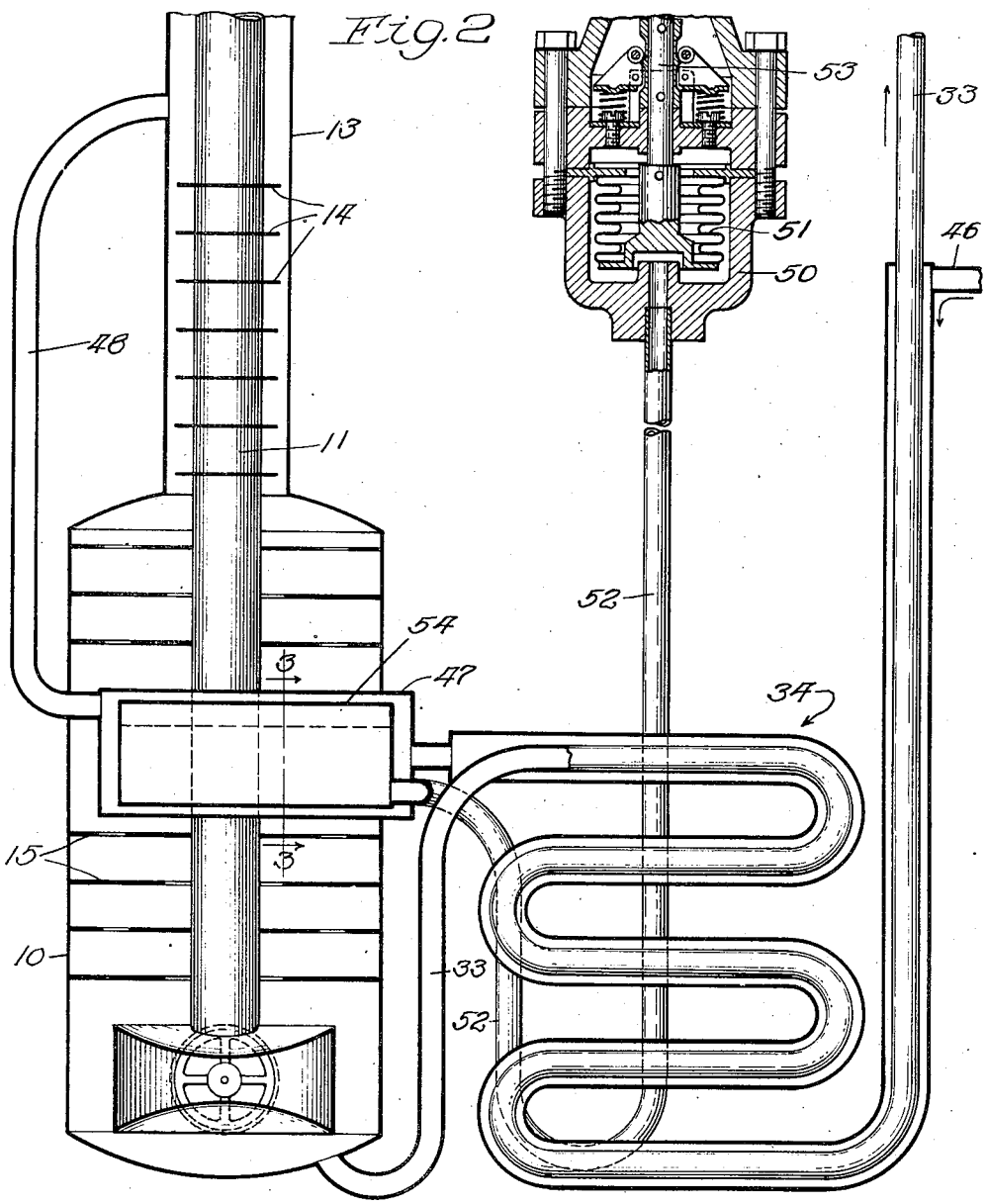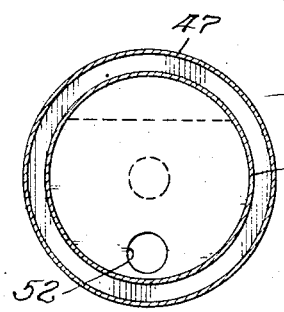

Patented Jan. 25, 1944

2,339,811

UNITED STATES PATENT OFFICE 2,339,811

ABSORPTION REFRIGERATOR

Joseph N. Roth, Belding, Mich., assignor, by mesne assignments, to Gibson Refrigerator Company, Greenville, Mich., a corporation of Michigan Application September 28, 1939, Serial No. 296,995

8 Claims. (Cl. 62—5)

This invention relates to an absorption refrigerator, and more particularly to a continuous absorption refrigeration system wherein rich liquor is periodically returned from the absorber to the still.

One feature of this invention is that the rates of evaporation or cooling and of the flow of liquid from the absorber to the still are a function of the amount of heat supplied to the still; another feature of this invention is that proper predetermined quantities and concentrations of liquid are at all times maintained in the various parts of the system; yet another feature of this invention is that the valve means controlling the flow of liquid to the still is actuated by means which effect such flow always at a predetermined concentration of the liquid in the still, regardless of variations in conditions to which the system may be exposed; another feature is that the actuating means is so constructed and arranged as to effect transfer of a desired quantity of liquid to the still at each transfer period; yet another feature is that the actuating means is so constructed and arranged as to effect quite positive and accurate control; still a further feature of this invention is that the actuating means includes temperature responsive means in the still; another feature of this invention is that the temperature-responsive means in the still is in heat exchange relation with rich liquor flowing into the still, so that the duration of such flow is limited; other features and advantages of this invention will be apparent from the following specification and the drawings, in which:

Figure 1 is a schematic diagram of a refrigeration system embodying this invention; Figure 2 is a vertical fragmentary view, principally in section, of the still and certain associated parts; and Figure 3 is a fragmentary sectional view of the actuator bulb and jacket, along the line 3—3 of Figure 2.

In the particular embodiment of the invention disclosed herewith the system in general comprises a still adapted to have a mixture of a refrigerant and an absorbent, as ammonia and water, boiled therein by the application of heat; a condenser connected by a vapor conduit to the still to liquefy the refrigerant vapor delivered thereby; an evaporator or cooling unit in which the liquefied refrigerant is permitted to vaporize, the evaporator having restricted connection with the condenser; an absorber in which the gas from the evaporator is reabsorbed in liquid; and means for effecting flow of weak liquor from the bottom of the still to the absorber and flow of rich liquor from the bottom of the absorber to the still. This latter means includes a transfer chamber intermediate the absorber and the still and a valve arrangement whereby the chamber is selectively connected to the absorber or to the still. Referring now more particularly to a specific system schematically or diagrammatically illustrated in Figure 1, the still 10 is adapted to contain a mixture of water and ammonia. A flue 11 is provided within the still and heat delivered thereto by the combustion of gas or some other fuel delivered by the burner 12. An analyzer tower 13, in the form of a long cylindrical tubing enclosing the flue 11, rises from the upper part of the still, which is a vertical cylindrical vessel. Both the analyzer tower and the still are provided with baffle plates, as 14 and 15, these plates serving to stratify the liquid in the still and to improve the efficiency of the apparatus.

Rich ammonia vapors boiled off the liquor in the still pass upwardly through the analyzer tower 13 and then through the pipe connection 16 to the rectifier 17, a finned inclined tube at the top of the system. From there the ammonia vapors, any entrained water vapor having been removed by the rectifier, pass down through the connection 18 to a condenser 19 at the lower end of the apparatus. This condenser comprises one or more loops of piping, finned to increase the heat radiation. The ammonia vapor is here condensed into liquid ammonia, and then elevated by the vapor pressure behind it through the connection 20 to the receiver 21.

The amount of ammonia boiled off and liquefied is a function of the concentration of the liquor in the still and of the amount of heat supplied to it, so that if the concentration of liquor is kept relatively constant the rate of delivery of liquid ammonia to the receiver 21 will be practically a direct function of the amount of heat supplied to the still. The amount of fuel delivered to the burner 12, and thus the amount of heat supplied and the rate of delivery of liquid ammonia to the receiver, can be regulated in any desired manner, as by a valve (not here shown) actuated in conventional manner by a thermostat in the cooling chamber of the refrigerator.

Liquid ammonia passes from the receiver 21 to the dry evaporator 22, preferably comprising several coils of piping, through the restriction interposed by a valve 23 controlled by the float 24. The float and valve are so arranged that, as more liquid ammonia is delivered to the receiver, the valve opens further to permit increased flow to the evaporator to maintain the level of liquid in the receiver substantially constant.

Absorbing apparatus is provided in the form of an upper chamber or vessel 25 having extending downwardly therefrom a cooling and absorption loop. This loop is formed by a pipe 26 extending down from the bottom of the absorber vessel; the absorber cooling coil 27, finned for better heat radiation; and the upwardly extending pipe or leg 28, terminating in the vessel 25 slightly above the level of absorption liquid therein.

Expanded ammonia vapor from the evaporator 22 first passes through a small loop or coil 29, to cool liquid in a chamber surrounding it, then through the pipe 30 into the rising leg 28 of the absorber loop, near the lower part thereof. The incoming vapor creates bubbles in the leg 28 of the absorber loop which provide a liquid lift or pump insuring circulation of absorption liquid through the loop. Inasmuch as the liquid in this rising leg is at all times the weakest liquor in the absorber, and cool as a result of passing through the coil 27, all absorption takes place in the pipe 28 under normal conditions, the liquid flowing out of the top of this pipe being quite rich.

The level of liquid in the absorber vessel 25 is maintained by a float 31 and valve 32 controlling delivery of weak liquor from the still. The pipe 33 leads from the lower end of the still (where the liquor is weakest) through a heat exchanger 34 and then on up to open into the absorber, the flow into the absorber being controlled by the valve 32, which opens whenever the level of liquid in the vessel 25 drops below a desired point.

The means for returning rich liquor from the absorber to the still comprises as its principal parts a transfer chamber 35, a valve assembly 36, a pressure chamber 37, and associated operative interconnections. A flow connection is provided from the leg 28 of the absorber loop, out of the open-ended short cross tube 28a, through the jacket 38, pipe 39, and check valve 40, into the pressure chamber 37. When the valves are set in a certain position a flow path is provided from the pressure chamber, and thus from the absorber, through the pipe 41, the valve mechanism, and the pipe 42 to the bottom of the transfer chamber 35, any vapor therein being vented through the pipe 43 and the pipe 44 (interconnected by the valve assembly) into the pressure chamber.

When the valve device is actuated, in accordance with a condition of the system, to move the valves to another position, the pipe 43 is connected to the pipe 45 which is open to high pressure vapor in the pipe 18; and the pipe 42 is connected to the pipe 46, connected through the heat exchanger 34, to a jacket 47 around a thermostat bulb in the still, and then through a pipe 48 into the analyzer tower. The transfer chamber and connecting pipes now being at high pressure, the rich liquor therein flows into the analyzer tower and thence to the still until the valves are again moved to the position first described above.

When the interconnection between the pressure chamber and the transfer chamber is again provided there is, of course, a rush of high pressure vapor through the pipes 43 and 44 to the chamber 37. The check valve 40, however, prevents these vapors from getting back into the low pressure side of the system; and the liquid in the chamber 37, cooled by the coil 29, rapidly absorbs the vapor, assisted in this respect by a fine stream of weak liquor bled into the chamber 37 through the conduit 49 branching from the weak liquor pipe 33. The rapid absorption of rich ammonia vapor causes the pressure in the chambers 35 and 37 to drop below the pressure in the absorber 25 for a brief time, so that there is a positive pressure-driven flow of rich liquor from the absorber to completely refill the chambers 35 and 37. When these are completely filled with liquid the weak liquor entering through the branch pipe 49 immediately starts to raise the pressure therein, the check valve 40 closing; and shortly the chambers 35 and 37 will again stand at high pressure. There is thus only a brief interval during which the valves in the assembly 36 must withstand the full difference of pressure between the high and low sides of the system.

While the general system above described contains a number of inventions and improvements over other known refrigeration systems, this present application is particularly concerned with the actuating means for effecting movement of the valves in accordance with a desired predetermined condition of the system, in this case the concentration of liquor in the still; and with the parts and improvements particularly associated with the valve-actuating means, and with the action of the various parts of the system which this improved actuating means makes possible. Other improvements in the system are being specifically described and claimed in other co-pending applications by myself and one Ralph E. Schurtz.

I have found that the smoothest operation, the best response to variation in load, the best over-all efficiency of the system, and the like, can be achieved if predetermined optimum quantities and concentrations of liquid are maintained in the various parts, as the still, the receiver, and the absorber. In order to maintain the quantity and concentration of liquor in the still relatively constant I have found that it is best to deliver relatively small quantities of rich liquor to the still periodically, the time of each delivery being determined by the liquor in the still having boiled down to a predetermined minimum preferred concentration.

In order to effect delivery of rich liquor when the liquor in the still has reached a predetermined concentration, the valve assembly 36 is actuated by a fluid thermostat having a bulb in the still and a liquid-actuating leg effecting movement of the valves. The thermostat is arranged to open the valves in the connection between the transfer chamber and the still when a predetermined desired maximum temperature of the liquor in the still (and thus a predetermined desired minimum concentration thereof) has been reached. In order to rapidly cool the thermostat and effect transfer of only a measured quantity of rich liquor to the still, the incoming rich liquor is passed in heat exchange relation with the thermostat bulb after it has gone through the heat exchanger 34 and before it passes into the analyzer tower.

Referring now more particularly to Figures 2 and 3, it will be seen that the valve assembly includes a lower housing 50 in which there is a Sylphon or metal bellows 51. This serves as a moving seal between actuating liquid on the outside thereof delivered from the thermostat bulb through the tube 52; and liquid on the inside thereof which is open to the pipe 46, and thus is at still or high pressure. Pressure of the actuating liquid thus acts, against the resistance of the still pressure and the mechanical resistance of the spring and roller means providing snap action, to move the rod 53; and this in turn moves the valves to a position, as described heretofore, wherein the transfer chamber has its liquid line connected to the pipe 46 and its top or vapor line connected to high pressure vapor delivered by the still. When the pressure of the actuating fluid in the tube 52 has dropped below a certain value the still pressure on the inside of the Sylphon snaps the rod 53 back down to the position shown in Figure 2, and thus moves the valves to a position connecting the transfer chamber 35 to the pressure chamber and absorber.

The thermostat bulb is a substantially cylindrical vessel 54 located in the still, with the tube 52 opening into it near its bottom, to be always below the level of liquid therein. The bulb and actuating leg or tube 52 form a hermetically sealed system completely separate from the rest of the system so that there is never any interchange of fluid. The chamber in the housing 50, outside of the Sylphon 51, the tube 52, and the major part of the bulb 54 are at all times filled with liquid, there being only a relatively small vapor space above the liquid in the bulb. The liquid level may, for example, be at the position indicated by the dotted line in Figure 3.

The liquid leg or tube 52 is provided with a downwardly extending loop or trap when it leaves the thermostat bulb and before it rises to the casing 50. This loop, coupled with the fact that the tube opens into the bulb below the level of the liquid therein, insures no loss of hot liquid or vapor from the bulb; the liquid in the bulb vaporizes and condenses at intervals without any interchange with the rest of the liquid in the actuating system, the remainder of the liquid merely acting as force transmitting means.

When the liquid in the thermostat bulb 54 is heated to a temperature where the vapor pressure above it exceeds the pressure of the vapor being delivered by the still by an amount sufficient to overcome the mechanical resistance of the snap-acting mechanism, the valve-actuating rod or member 53 moves to its upper position; and when the vapor pressure has dropped to a point sufficiently below still pressure, the valve-actuating rod returns to the position shown in Figure 2.

In order to have a positive snap action mechanism, necessary to preserve the life of the valves and to insure that they will be either completely closed or completely open, sufficient mechanical resistance must be interposed thereby to require a fairly considerable change in pressure in the bulb to effect movement from one position to the other. When the valve assembly has been placed in position connecting the transfer chamber to the still by the actuating bulb, there would have to be a considerable drop in still temperature before the valve mechanism would shift back, were it not for the outer jacket 47. That is, if the bulb were placed directly in the still in the liquor, without any surrounding jacket, the rate of temperature decrease would be so slow that an undesirably large quantity of rich liquor would enter the still before the valves were thrown back to their other position.

By providing the jacket 47 through which incoming rich liquor flows in heat exchange relation to the thermostat bulb, however, rapid return of the valves is achieved. When the liquor in the still has boiled down to a predetermined desired concentration, its temperature causes the bulb and actuating leg to throw the valves to a position connecting the transfer chamber to the still, the liquid connection being through the pipe 46. Rich liquor flowing through this pipe is relatively cool, and it passes first through the heat exchanger 34 to recover some of the heat from the weak liquor in the pipe 33 to the absorber. It then flows through the outer annular jacket space around the thermostat bulb 54, and thence up through the pipe 48 to spill into the analyzer tower. The flow of still relatively cool liquor through the jacket around the bulb results in a relatively rapid reduction of the temperature of the fluid in the bulb, and thus a fairly rapid return of the valves to a position disconnecting the transfer chamber from the still. In normal operation of a domestic refrigerator employing the system disclosed herein, the liquid in the still boils down to a concentration such that the transfer chamber is connected to the still about once every eight or nine minutes; and the cooling effect of the rich liquor flowing through the jacket around the thermostat bulb is such that the transfer chamber is disconnected from the still in less than a minute thereafter. If the demand for refrigeration is slight and the amount of heat supplied to the still low, transfers take place less frequently; whereas, if the demand for refrigeration is great, and considerable heat is supplied to the still, the transfer operation will take place a little more frequently.

I have found that very accurate control of the valve actuation can be achieved, as a function of the concentration of the liquor in the still, by filling the thermostat bulb and leg with a mixture of ammonia and water of substantially the concentration at which it is desired to effect delivery of rich liquor to the still. The concentration in the bulb must, of course, be slightly higher, since it must generate a pressure sufficiently exceeding that of the liquor in the still to overcome the mechanical resistance to movement of the valves and associated mechanism. A very efficient minimum concentration for the liquor in the still has been found to be 18%; and in order to achieve transfer at this concentration the transfer bulb and leg should be filled with a water-ammonia solution having a concentration one or two percent higher. If the apparatus and procedure disclosed herewith are followed, the concentration of liquor in the still itself can be kept within a narrow and desirable range; as for example, the average concentration can be maintained between eighteen and twenty-one percent at all times. The amount of cooling of the incoming rich liquor in the heat exchanger 34 before it reaches the jacket 47, and the efficiency of heat transfer between this liquor and that in the bulb, can be so designed as to provide and maintain a quite definite period of transfer of rich liquor to the still, despite variations in room temperature, cooling chamber load, and the like.

As has been heretofore pointed out during the detailed description of the construction and operation of the refrigerator, the particular arrangement, coupled with a control or actuating fluid having the same temperature-pressure characteristics as those of a water-ammonia solution of the percentage at which it is desired to maintain the still, maintains the desired concentrations and quantities of liquid substantially constant throughout the system; improves the over-all efficiency of the system; and enables control of refrigeration as a function of fuel flow.

I have found that the best over-all operation of a domestic continuous absorption refrigerator of the type herein disclosed is attained when the concentration in the still is maintained at about eighteen percent and that in the absorber at about thirty or thirty-one percent. All refrigerant vapor liquefied by the condenser is very rapidly pushed up into the receiver, so that the amount of actual liquid in the condenser is practically a constant factor regardless of changes in room temperature, food chamber load, or the like. Since the valve means controlling the flow of liquid refrigerant from the receiver is float operated, the quantity of refrigerant in the receiver is constant; and since the level of liquid in the absorber is also maintained constant, together with the fact that the transfer or pressure chambers are always refilled completely after each transfer, the concentration of liquid in the absorber is obviously a function of that in the still. That is, if the concentration of ammonia in the still can be kept substantially constant, that in the absorber will likewise remain substantially constant, although at a different figure if that is desirable.

The pressure in the still, however, is bound to vary with room temperature, since the pressure at which vaporized refrigerant will condense is a function of the condenser temperature, and this in turn a function of room temperature. Previous work in continuous absorption systems of this kind have used factors such as still temperatures for effecting transfer of liquid from the absorber to the still; and this resulted in wide swings of concentration in various parts of the system, with resulting undesirable operation of the apparatus. By using a control fluid having the same pressure temperature characteristics as the desired still concentration (actually the same fluid as that in the still), and by balancing still pressure against control fluid pressure to cause the excess of one over the other to actuate the transfer valves, I provide transfer actuating means which is independent of room conditions or other variable operating conditions of the system.

Under a system using still temperature alone as the factor determining operation of the transfer valves, it might for example be assumed that the thermostat was set to effect flow to the still at 294° F. This would correspond to a room temperature of about 90° F. (assuming the condenser to operate ten degrees higher), and a still and condenser pressure of two hundred pounds gage (pure ammonia condenses at 100° F. at 200 pounds gage pressure); and a still concentration of 18%, since a 18% ammonia-water solution would boil at 294° at 200 pounds gage pressure. If the room temperature went up to 110° F., however, the pressure in the high side of the system would be 275 pounds gage (pure ammonia condenses at 120° F. at 275 pounds). Under these circumstances transfer would take place when the still concentration was about 24%, since a 24% solution boils at 294° F. against 275 pounds gage pressure. On the other hand, when the room temperature drops to 70° the condenser might be assumed to be operating at 80° with resultant high side pressure of about 138 pounds gage. The water-ammonia solution boiling at 294° F. at this pressure is about 12.5%, so that in a 70° room the still liquid would boil down to this concentration before transfer took place. While this may be considered merely as an assumed example, it closely approximates actual conditions at the temperatures and pressures stated, which are those derived from theoretical curves. Under a system which effected transfer solely as a function of still temperature, therefore, still concentration would swing from about 12.5% to about 24% as room temperature changed from 70° to 110°; and this would result in great instability of the system, with changes in operation all through it. This is occasioned by the fact that as still concentration rises absorber concentration would drop, and vice versa.

By charging the control thermostat bulb with an ammonia-water solution substantially the same as that at which it is desired to maintain the still (preferably at one or two percent higher than the eighteen percent concentration, for example, at which it is desired to add more rich liquor to the still), and balancing the pressures generated in the still and the bulb against each other, control apparatus is provided which effects transfer in accordance with concentration in the still, independently of changes in room temperature, for example. In a system using this improved form of control, transfer would be effected in a 70° room at a still temperature of about 268° F.; in a 90° room at a temperature of about 294° F.; and in a 110° room at a still temperature of about 320° F. In each case, however, the solution which had been enriched by a couple of percent by the addition of rich liquor from the absorber would boil down to 18% concentration, whereupon transfer would again take place. It will thus be seen that the concentration of the still would only vary within narrow limits, as for example from eighteen to twenty percent; and that similarly the concentration in the absorber would remain substantially constant, preferably being maintained at about thirty or thirty-one percent, for example. Since an exothermic reaction is taking place in the absorber it has a tendency to be above room temperature, experience having shown me that in the apparatus disclosed the absorber generally has a temperature about 20° above room temperature.

In the system herewith disclosed and claimed by me it will be seen, therefore, that while still temperature may swing widely, initiation of flow of rich liquor to the still is always effected at the same desired minimum concentration. By having the incoming rich liquor flow in heat exchange relation with the control bulb it is rapidly cooled, so that it closes the transfer valves shortly after initiation of the flow, only small quantities of rich liquor being added to the still at each transfer operation, so that its concentration is not raised more than a few percent. By interlocking the other parts of the system with the still, by the float valves which maintain constant quantities of liquid in the receiver and in the absorber, substantially constant quantities and concentrations of liquid are maintained in each particular portion of the system at all times. This is highly advantageous in a continuous absorption refrigeration system, permitting optimum concentrations and over-all efficiency to be maintained at the various points, and control of refrigeration effect to be readily attained.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Control apparatus of the character described for a continuous absorption refrigeration system having a still, a condenser, an evaporator, an absorber and operative connections therebetween, at least one of the connections including a movable element for controlling the flow of fluid therethrough, including: temperature responsive means at least partially immersed in the still liquid and operative, when a predetermined temperature is reached by the liquid in the still, to move the element to permit a flow of fluid to the still; and means for causing said fluid to flow in a controlled path in heat exchange relation with the temperature responsive means to effect a cessation of flow relatively shortly after initiation thereof.

2. Control apparatus of the character described for a continuous absorption refrigeration system having a still, a condenser, an evaporator, an absorber and operative connections therebetween, flow of liquid from the absorber to the still being controlled by a first valve and flow of liquid from the still to the absorber being controlled by a second valve, including: temperature responsive means at least partially immersed in the still liquid and operative, when a predetermined temperature is reached by the liquid, to move the first valve to open position; and means for causing the fluid flowing to the still upon the opening of the first valve to flow in a controlled path in heat exchange relation with the temperature responsive means, whereby the first valve closes within a relatively short period after it has opened.

3. Apparatus of the character claimed in claim 2, wherein the last mentioned means comprises a jacket surrounding the temperature responsive element and through which all of the fluid flowing to the still passes.

4. In an absorption refrigeration system including a still, temperature responsive control apparatus of the character described, including: a thermostat element exposed to temperature variations of liquid in the still and adapted to effect a desired control movement when a certain temperature is reached; and a jacket surrounding the element providing a flow path for fluid at a temperature different from that to which the thermostat element is normally exposed.

5. In a refrigeration system, temperature responsive control apparatus of the character described, including: a fluid thermostat bulb exposed to temperature variations and adapted to effect a desired control movement when a certain temperature is reached; and a jacket surrounding the bulb and providing a flow path for fluid at a temperature different from that to which the thermostat element is normally exposed, flow through said path being controlled by the thermostat bulb.

6. Apparatus of the character claimed in claim 1, wherein the control limits of the temperature responsive means and the efficiency of heat exchange are so proportioned as to cause flow of only a desired quantity of fluid.

7. Control apparatus of the character described for a continuous absorption refrigeration system having a still, a condenser, an evaporator, an absorber, a heat exchanger, an analyzer tower above the body of liquid in the still, and operative connections therebetween, at least one of the connections including a movable element for controlling the flow of fluid therethrough, including: temperature responsive means operative, when a predetermined temperature is reached by the liquid in the still, to move the element to permit a flow of fluid to the still; and means for causing the fluid flowing to the still to flow first through the heat exchanger in heat exchange relation with fluid flowing from the still to the absorber, then in heat exchange relation with the temperature responsive means to effect a cessation of flow relatively shortly after initiation thereof, and then into the analyzer tower.

8. A continuous absorption refrigeration system of the character described, including: a still; a condenser; an evaporator; an absorber; a vapor connection from the still to the condenser; a connection from the condenser to the evaporator including valve means controlling the rate of flow in accordance with the quantity of liquefied vapor available; a connection from the evaporator to the absorber; liquid flow circuit connections between the still and the absorber, comprising a connection from the still to the absorber including weak liquor valve means controlled by the level of liquid in the absorber, and a connection from the absorber to the still including rich liquor valve means; a bulb in heat exchange relation with the liquid in the still charged with a fluid having pressure-temperature characteristics substantially the same as the refrigerant-absorbent concentration at which it is desired to effect flow of liquid from the absorber to the still; and actuating means for the rich liquor valve wherein still pressure is opposed to control fluid pressure and movement of the valve is effected by the excess of one of the pressures over the other, fluid flowing from the absorber to the still passing through a controlled path in heat exchange relationship with the control fluid to cause the rich liquor valve to close shortly after it opens, whereby the quantity and concentration of liquid in various parts of the system is maintained substantially constant despite variations in operating conditions.

JOSEPH N. ROTH.